United States Patent [19]

Maruyama et al.

[11] Patent Number: 4,595,544
[45] Date of Patent: Jun. 17, 1986

[54] METHOD OF MANUFACTURING A CONTAINER COVERED WITH PROTECTIVE SHEET

[75] Inventors: Hisao Maruyama, Toyonaka; Masahiko Kitajima, Izumi; Tsutomu Matsubara, Nishinomiya, all of Japan

[73] Assignees: Fuji Seal Industry Co., Osaka; Yamamura Glass Kabushiki Kaisha, Hyogo, both of Japan

[21] Appl. No.: 604,914

[22] Filed: Apr. 27, 1984

[30] Foreign Application Priority Data

Apr. 30, 1983 [JP] Japan ................... 58-77000

[51] Int. Cl.⁴ .................. B29C 61/02; B29C 63/42
[52] U.S. Cl. .................. 264/46.5; 264/46.9; 264/50; 264/230; 264/342 R; 264/DIG. 71
[58] Field of Search .................. 156/86; 428/910; 264/DIG. 71, 230, 342 R, 50, 46.5, 46.9

[56] References Cited

U.S. PATENT DOCUMENTS 2,945,776 7/1960 Congusti et al. ................ 264/50 X
4,463,861 8/1984 Tsubone et al. ................ 428/910 X
4,486,366 12/1984 Reddy ......................... 264/342 R X Primary Examiner—Evan K. Lawrence
Attorney, Agent, or Firm—Austin P. Miller

[57] ABSTRACT

A method of manufacturing containers covered tightly with a protective sheet with a porous resin film layer or rubber film layer in-between.

By the method of this invention, a resin solution or rubber solution is foamed mechanically in advance and the foamed layer made by the foamed resin film or the foamed rubber film then is covered with a heat shrinkable sheet which is heat shrunk tightly to the containers. The foamed layer does not shrink during the heating. Accordingly, the surface of the heat shrinkable sheet is free from waviness due to gas foaming of the covered layer during heat shrinking which has been the case with conventional methods. The method, therefore, does not affect the appearance or printing performance of the surface of the heat shrinkable sheet.

4 Claims, 5 Drawing Figures

METHOD OF MANUFACTURING A CONTAINER COVERED WITH PROTECTIVE SHEET

BACKGROUND

This invention relates to a method of containers covered with a protective sheet. Ordinarily, the glass bottles and other containers containing soft drinks are covered with a heat shrinkable sheet made of oriented film of polyvinyl chloride or of polystyrene and others so as to prevent breakage by external impact and to avoid scattering of broken pieces.

Though effective to prevent scattering of fragments of broken glass bottles, such heat shrinkable sheets do not prevent breakage of the glass bottles because the cushion effect is rather low.

It has been tried, therefore, to improve the cushion effect of heat shrinkable sheets or to provide a cushion layer between a heat shrinkable sheet and the glass bottle.

In the former case, a foamed layer is provided on the surface of the heat shrinkable sheet, the glass bottle is telescopically encircled by this heat shrinkable sheet with the foamed layer, which is then shrunken by heat treatment.

In the latter case, a low-temperature heating type foaming ink is applied to the back side of a heat shrinkable sheet to be dried, glass bottles are telescopically encircled with the heat shrinkable sheet keeping the ink covered side onto the glass bottles, then the heat shrinkable sheet is shrunken by heat treatment and the foaming ink is expanded at the same time to provide a foamed layer.

In the former case, however, the sheet is broken if a scratch is made on the surface since the foamed layer is provided on the outside of the heat shrinkable sheet. In the latter case, no such problem occurs because the foamed layer is provided on the inside of the heat shrinkable sheet. However, waviness occurs on the outer surface of the heat shrinkable sheet as it is difficult to adjust the degree of shrinking of the heat shrinkable sheet and the degree of foaming of the foaming ink (i.e., the degree of foaming gas generation) at the time of heat treatment.

To provide a foamed layer by expanding the foaming ink, it is necessary to expand the foaming ink by overcoming the thermal contraction of the heat shrinkable sheet, which requires a large quantity of gas generating type foaming agent in the foaming ink. Increasing the quantity of the foaming agent, however, makes it more difficult to balance the thermal contraction of the heat shrinkable sheet and the foaming power of the foaming agent. This results in the formation of projected layers in the form of lateral strips on the surface of the sheet after heat shrinking, and the appearance is degraded significantly.

This phenomenon occurs not only in the case where a low temperature heating type foaming ink is applied to the back of heat shrinkable sheets, but also when a low temperature heating type foaming ink is applied directly around the surface of a bottle to be dried, and is covered with a heat shrinkable sheet for heat treatment.

SUMMARY OF THE INVENTION

This invention includes a method of manufacturing a container covered with a protective sheet including the steps of mechanically mixing a resin in the presence of gas in order to entrap the gas and form a multiplicity of gas cells within the resin, hardening the resin with gas cells therein to form a foamed resin film which does not shrink when exposed to subsequent heat treatment, placing the nonshrinkable mechanically foamed resin film on an outer surface of a container, placing a protective sheet which undergoes shrinkage during heat treatment over the foamed resin film and contracting the heat shrinkable protective sheet by heat treating same to tightly cover the foamed resin film and the container.

It is a primary object of the present invention to provide a method of manufacturing containers covered with a protective sheet which is free from any breakage due to scratches. Another object of the present invention is to provide a method of manufacturing containers covered with a protective sheet wherein the surface of the protective sheet is finished smoothly.

DETAILED DESCRIPTION

Glass bottles adapted to contain liquids such as soft drinks, for example, are one application of the present invention. Since the bottle contents are typically pressurized, the glass bottles are easily broken, even by a slight impact. This invention is effective to prevent breakage of such pressurized glass bottles and to avoid scattering of fragments of a broken bottle. As the heat shrinkable sheet, an oriented film of polyvinyl chloride or of polystyrene is used, as mentioned at the outset. As the film, a mono-directional heat shrinking type is ordinarily used while keeping the shrinking direction in the lateral direction of the containers. In addition to oriented films, paper including heat shrinkable fibers, and non-woven and woven cloth of heat shrinkable fibers may be used as the heat shrinkable sheet. These materials are shrunken by thermal contraction of the component fibers. Acrylic ester water emulsion, acetic acid vinyl water emulsion, ethylene-acetic acid vinyl water emulsion, urethane water emulsion, vinyl chloride water emulsion, styrene water emulsion, vinylidene chloride water emulsion, epoxy water emulsion, and synthetic rubber latices (SBR, NBR, Chloroprene) etc. may be used as the resin or rubber composing the foaming layer. A foaming stabilizer comprising an ion or nonion active agent, for example, is added to these water emulsions and rubber latices to be foamed by mechanical agitation. In this case, the foaming is maintained for a long time by setting the viscosity of the water emulsion or the latex at a rather high level. It may also be possible to use organosols instead of the water of the above water emulsion. It would also be possible to add low-temperature expansion type micro-capsules into the above water emulsions, rubber latices, or organsols. The low-temperature expansion type micro-capsule does not damage the smoothness of the surface as it expands at a lower temperature than that of a gas generating foaming agent and does not generate any gas. To improve the strength of the foamed layer, it may also be possible to disperse inorganic filler or hollow glass beads into the above mentioned resin water emulsions, or rubber latices.

The following is a description of an example of manufacturing protective sheet covered containers by the method of the present invention.

Figure 3:
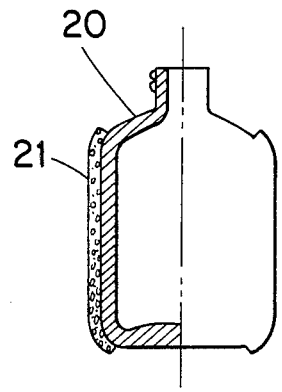
FIG. 3 is a side view, shown partly in section, of a container having a foamed layer positioned therearound.
Figure 4:
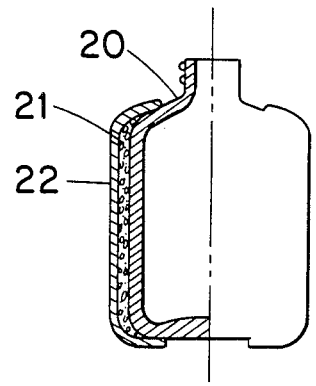
FIG. 4 is a side view, shown partly in section, of the container illustrated in FIG. 3 with a heat shrinkable film wrapped around the foamed layer.

First, the above-mentioned water emulsion or rubber latex is mechanically foamed with a foaming machine while setting the foaming ratio, desirably, at 1.5 to 10 times so as to obtain a favorable foamed layer. Referring to FIGS. 3 and 4, the foamed water emulsion or rubber latex is applied around the outer surface of a bottle 20 by a known method such as the screen method, the roll covering method, or the brushing method. The covered water emulsion or rubber latex is then dried by a dryer known to the public to make a foamed resin or rubber film 21.

If the water emulsion or the rubber latex includes low-temperature expansion type micro-capsules, the micro-capsules may be expanded at drying or after heat shrinking of the heat shrinkable sheet.

The bottle therefor 20 with film 21 is dried and then covered with a heat shrinkable sheet 22, which is contracted by heat treatment to cover the bottle 20 tightly.

Thus a bottle 20 tightly covered with a protector made of a heat shrinkable sheet 22 is obtained. Since the foaming layer of this bottle 20 is made by mechanical foaming and not by gas foaming, the heat shrunken sheet 21 is smooth and the appearance is neat. In the prior art process, even though the foaming ink and water emulsion are applied in even thickness around a bottle, because the foaming is made by gas foaming wherein the foaming ink generates gas during the following heat shrinking processing of the heat shrinkable sheet, the sheet surface is made uneven.

In the present invention the water emulsion has already been turned into a foamed layer by the time of heat shrinking of the sheet 22 and the foamed layer 21 is not changed by the heat treatment and keeps the initial even thickness. Accordingly, the bottle 20 covered with a protective sheet 22 of the present invention maintains a smooth surface on the heat shrunken protective sheet 22. The surface smoothness is not affected even if low-temperature expansion type capsules are dispersed into the water emulsion or rubber latex and are expanded because the expansion is absorbed by the mechanically foamed forms. The bottle 20 is also free from scratches on the foamed layer 21 which has been a problem with conventional methods because the foamed layer 21 is inside of the heat shrinkable sheet 22.

Figure 5:
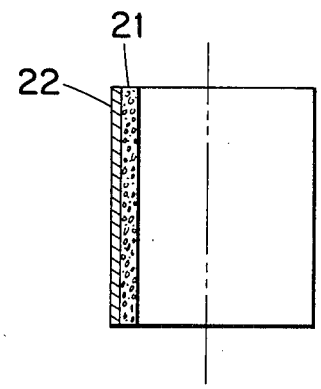
FIG. 5 illustrates another embodiment of the present invention, shown partly in section, wherein the foamed layer is bonded to the heat shrinkable sheet and wound into the shape of a cylinder, prior to placement around a cylindrically shaped container.

Although the water emulsion or rubber latex is applied to the outer surface of the bottle 20 in the above description, the same effect can be obtained in the embodiment illustrated in FIG. 5 by applying the water emulsion or the rubber latex 21 to the back-side of the heat shrinkable sheet 22 and by heating the sheet 22 while placing the covered side of the sheet 22 onto the bottle surface so as to cover the bottle tightly with the sheet. The water emulsion or rubber latex 21 may be applied to the whole surface of the bottle or of the heat shrinkable sheet 22 or to a part of the surface. Making bottles covered with a protective sheet in this manner, the present invention ensures protective sheet covered bottles with a smooth surface.

In other words, the surface of the heat shrunken protective sheet is free from waviness, which occurs with conventional methods, and is finished very smooth because the foamed layer is made by foaming a resin solution or rubber solution mechanically in advance instead of producing a foamed ink layer by gas foaming by using the heat used to contract the heat shrinkable sheet, as has been the practice heretofore.

The effect of smooth finish of the protective sheet is more significant when patterns or letters are printed on the sheet surface as the printing is not deformed.

The bottles coated according to this invention are also free from breakage of the sheet due to scratches on the foamed layer which has been the case with conventional methods since the foamed layer is positioned inside the protective sheet.

Moreover, by the present invention, the foamed layer film thickness remains constant throughout the process, making the setting of the foamed layer thickness very easy.

On the other hand, the thickness of a conventional foamed layer produced by a gas generating foaming agent is determined by the quantity of generated gas and the contracting force of the heat shrinkable sheet. Accordingly, setting the layer thickness is quite difficult, making it hard to maintain an even thickness at all times and increasing deviation in the quality. Now the present invention will now be illustrated with some embodiments together with some examples for comparison.

EMBODIMENT 1

The water emulsion was prepared by compounding the following materials (parts by weight).

Acrylic acid ester emulsion (Kanebo NSC, iodine zol A-5805): 100

60% titanium oxide paste: 28

Diatom earth (Hakusan Kogyo, Zemlight Super-3): 40

Nonionic emulsifier (Emulgen #810 by Kao Soap Co.): 0.3

Cellulose thickener (Unisell #P15000 by Daicel Ltd.): 0.3

Ammonium stearate (Kanebinole YC-80 by Kanebo NSC): 7

Water: 14

The above water emulsion (viscosity: 10,000 CPS) was foamed mechanically by agitating with a mixer for 5 minutes and the foaming was stopped at the foam ratio of 2 times. Then the foamed water emulsion was covered over a film of oriented polystyrene copolymer with a bar coater, and dried for 3 minutes at 50° C. to make a foamed layer of 50μ film thickness.

The film was rolled into a cylinder while keeping the foamed layer inside, the opposite marginal end portion was sealed with an ultrasonic heat sealing machine, and a glass bottle (containing 300 cc water) was encircled with this film.

The film was then heated for 3 minutes at 130° C. to shrink and to cover the glass tightly.

For comparison, a sample glass bottle only (comparison example 1) and a glass bottle tightly covered with oriented polystyrene copolymer film (comparison example 2) were prepared.

Table 1 shows the result of the break-down test (drop test) of the glass bottle of the above embodiment and the sample bottles for comparison.

TABLE 1

|  | Average (X) (cm) | Max.* (cm) | Min.** (cm) |
| --- | --- | --- | --- |
| Glass bottle of the embodiment | 52.0 (158%) | 65.0 | 35.0 |
| Comparison sample 1: (Bottle only) | 33.0 (100%) | 55.0 | 20.0 |
| Comparison sample 2: (Bottle + Film) | 46.5 (140%) | 65.0 | 30.0 |

*The maximum drop distance of bottle breakage.
**The minimum drop distance of bottle breakage (To prevent bottle breakage, the drop distance must be set lower than the minimum value.)

Table 1 indicates that the bottle of the embodiment is more resistant to breakage than the sample bottles for comparison. Particularly, the minimum (the minimum drop distance to breakage) is substantially larger than those of the sample bottles. This is quite important for sales with automatic vending machines with soft drinks filled inside.

When a bottle is sold and pulled out from an automatic vending machine, the next bottle over the sold one drops to the pull out position.

The drop distance must be set so that no bottles are broken at this dropping as breakage of even one bottle ruins the value of the whole bottles of the soft drink. With the bottle of the above embodiment, the drop distance can be set longer because the minimum value is larger as shown in Table 1. If the drop distance is set equally, the safety against bottle breakage can be higher than those of the sample bottles for comparison.

Figure 1:
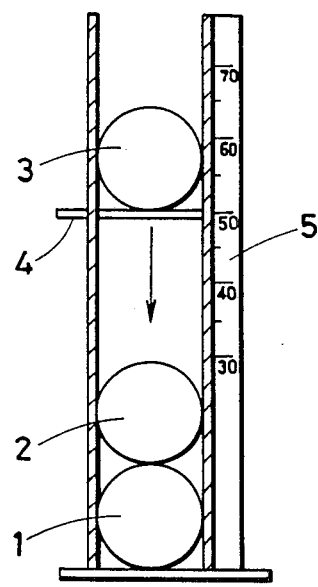
FIG. 1 is an explanatory drawing to show the bottle breaking test.

For the said bottle breakage test, a device as shown in FIG. 1 was used. Two bottles filled with water, bottle (1) and bottle (2) are placed one on the other, and the third bottle (3) is placed over the two bottles and is held by a plate (4). The plate (4) is pulled out to the left to drop the bottle (3). If any one of the three bottles (1) (2) (3), is broken, the height (drop distance) is read on the scale plate (5). If no bottles are broken at certain height, the plate is raised to the next graduation to repeat the dropping. Any one of the broken bottle is replaced with a new bottle to repeat the test.

Figure 2:
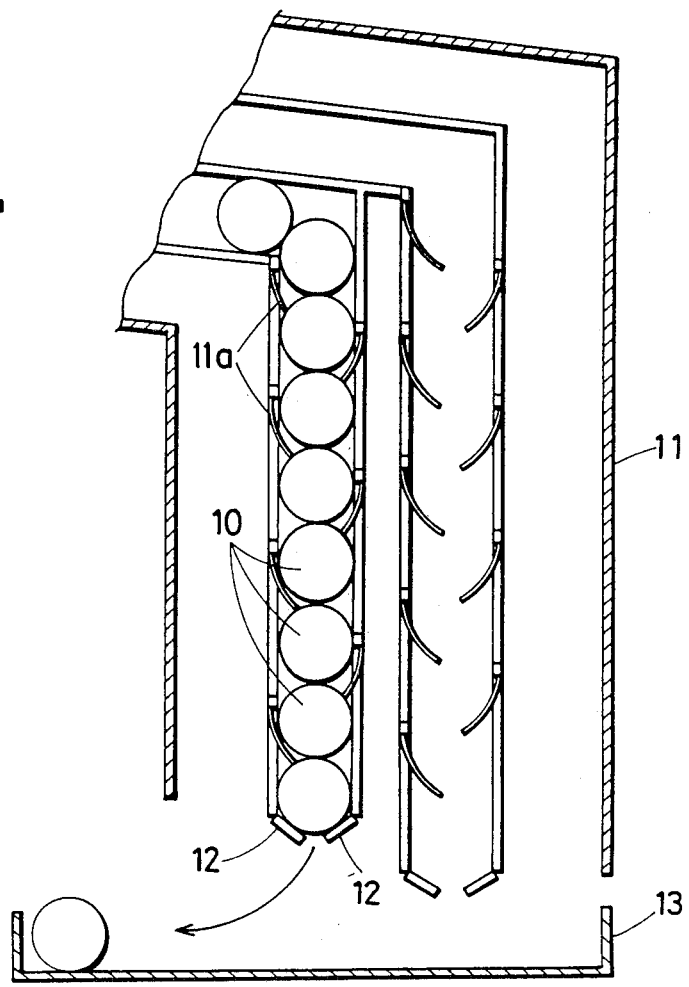
FIG. 2 is a sectional drawing showing the bottle filling condition in a soft drink bottle automatic vending machine.

Table 2 shows the result of the bottle breakage test with bottles filled with sodium hydrogen carbonate instead of water as used in the said embodiment, then capped to keep the internal pressure at 3.75 kg/cm² (same pressure as commercially available bottled soft drinks) and set in an automatic vending machine as shown in FIG. 2. (The test was made on 3100 bottles.)

In FIG. 2, (10) are glass bottles, (11) is the take-out guide of the automatic vending machine, (11a) are the drop guide claws which turn freely, (12) are the holding plates which are opened and closed freely to drop the bottle (10) at the bottom at input of coins.

(13) is the receiver to receive the dropped bottle.

TABLE 2

|  | Broken bottles (out of 3100 bottles) |
| --- | --- |
| Bottles of embodiment | None |
| Comparison sample 1 (Bottle only) | Not tested for expected danger due to breakage of a great number of bottles |
| Comparison sample 2 (Bottle + Film) | 2 bottles |

As shown in Table 2, the bottles of the embodiment are free from any breakage, which indicates the covering is quite effective for protection of the bottles.

EMBODIMENT 2

The compound A was prepared by mixing the following raw materials in parts by weight.

COMPOUND A

Low temperature expansion type micro-capsule (Micro-fastener F-30 by Matsumoto Fats and Oils): 44
Nonionic emulsifier (Emulgen #810): 3
60% Titanium oxide paste: 30
Defoaming agent (Nobco NXZ by Sun Nobco): 0.6
Water: 23

The compound A was mixed with the following raw materials to obtain a water emulsion of 23,000 CPS viscosity.

WATER EMULSION

Acrylic acid emulsion (A-500): 100.0
Compound A: 44.6
Defoaming agent (Nobco NXZ): 1.5
Nonionic emulsifier (Emulgen #810): 0.2
Cellulose thickener (Unicell QP15000): 0.2
Ammonium stearate (Kanebinol YC-80): 7.0

Then the water emulsion was agitated mechanically with a mixer for five minutes, the agitation was stopped at a foaming ratio of two times, the water emulsion was applied over oriented polystyrene copolymer film with a bar coater, and dried at 50° C. for three minutes to form a foamed layer of 50μ film thickness on the film surface.

The film with foamed layer was rolled into a cylinder keeping the foamed layer inside, the opposite marginal end portion was sealed by a ultrasonic heat sealing machine, and the bottle was telescopically encircled with this cylinder.

The bottle was then heated at 130° C. for 3 minutes to shrink the film and to cover the glass bottle tightly.

For comparison, bottles were also prepared by applying foaming ink containing gas generating type foaming agent instead of the water emulsion and by making the foamed layer by gas foaming when the film is contracted by heat treatment. These samples were subjected to bottle breakage tests and the smoothness of the film surface was also checked.

Table 3 shows the results of the tests indicating that the bottles of the embodiment are superior in both the bottle breakage test and in surface smoothness.

TABLE 3

|  | Bottle breakage test | Surface smoothness |
| --- | --- | --- |
| Bottles of embodiment 2 | 57.5 | Good |
| Comparison sample | 50.0 | No good (Waviness) |

While some preferable embodiments of the present invention have been illustrated and described, it is to be clearly understood that the invention is not limited thereto or thereby and various kinds of alterations are possible within the scope of the claims attached hereunder.

What is claimed is:
1. A method for manufacturing a container covered with a protective sheet, comprising mechanically mix- ing a resin in the presence of a gas in order to entrap the gas and form a multiplicity of gas cells within the resin, hardening said resin having gas cells therein to form a foamed resin film which does not shrink when exposed to subsequent heat treatment, placing the non-shrinkable mechanically foamed resin film on an outer surface of the container, placing a protective sheet which undergoes shrinking during the subsequent heat treatment over the foamed resin film and contracting said heat shrinkable protective sheet by the heat treatment to cover the foamed resin film and the container tightly.

2. A method for manufacturing a container covered with a protective sheet in accordance with claim 1, wherein the container is a glass bottle filled with a soft drink.

3. A method for manufacturing a container covered with a protective sheet, comprising mechanically mixing rubber in the presence of a gas in order to entrap the gas and form a multiplicity of gas cells within the rubber, hardening said rubber having gas cells therein to form a foamed rubber film which does not shrink when exposed to subsequent heat treatment, placing the non-shrinkable mechanically foamed rubber film on an outer surface of the container, placing a protective sheet which undergoes shrinking during subsequent heat treatment over the foamed rubber film and contracting said heat shrinkable protective sheet by heat treatment to cover the foamed rubber film and the container tightly.

4. A method for manufacturing a container covered with a protective sheet in accordance with claim 3 wherein the container is a glass bottle filled with a soft drink.

* * * * *